(12) United States Patent
SayyarRodsari et al.

(10) Patent No.: US 11,644,823 B2
(45) Date of Patent: May 9, 2023

(54) AUTOMATIC MODELING FOR MONITORING, DIAGNOSTICS, OPTIMIZATION AND CONTROL

(71) Applicant: ROCKWELL AUTOMATION TECHNOLOGIES, INC., Mayfield Heights, OH (US)

(72) Inventors: Bijan SayyarRodsari, Austin, TX (US); Alexander B. Smith, Round Rock, TX (US); Kadir Liano, Pflugerville, TX (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 974 days.

(21) Appl. No.: 15/720,714

(22) Filed: Sep. 29, 2017

(65) Prior Publication Data

US 2019/0101902 A1 Apr. 4, 2019

(51) Int. Cl.
*G05B 19/418* (2006.01)
*G06N 5/025* (2023.01)
(Continued)

(52) U.S. Cl.
CPC ..... *G05B 19/41885* (2013.01); *G05B 19/054* (2013.01); *G05B 19/4187* (2013.01);
(Continued)

(58) Field of Classification Search
CPC .............. G05B 19/054; G05B 19/4187; G05B 19/4184; G05B 2219/32352; G05B 23/0221; G05B 19/41885; G05B 23/0254; G06F 9/44; G06F 11/30; G06N 5/025; G06N 20/00; G06N 99/005; C07F 5/02; C09K 11/06; H01L 51/00; H01L 51/50; Y02P 90/02
See application file for complete search history.

(56) References Cited

U.S. PATENT DOCUMENTS 6,934,931 B2 *  8/2005  Plumer ................. G06Q 10/06
                                                       717/104
8,630,975 B1 *  1/2014  Guo ........................ G06N 7/005
                                                       707/608

(Continued)

OTHER PUBLICATIONS

Ross, Stephane, and J. Andrew Bagnell. "Agnostic system identification for model-based reinforcement learning." arXiv preprint arXiv:1203.1007 (2012).*

(Continued)

*Primary Examiner* — Jay Hann
(74) *Attorney, Agent, or Firm* — Fletcher Yoder, P.C.

(57) ABSTRACT

A modular modeling engine is provided for industrial automation applications. The module may be instantiated upon demand, such as upon receipt of annotated data for a system or process being monitored and/or controlled. The model is agnostic insomuch as little or no prior knowledge is required of the system or process. Variables, functions, and their combinations are selected and the model is refined automatically. A data structure is received for instantiation of the model, and following modeling, a similar data structure is produced. The module may be used together with other modules for caning out complex automation processing at the same or multiple levels in an automation setting.

20 Claims, 12 Drawing Sheets

(51) Int. Cl.
*G06N 20/00* (2019.01)
*G05B 23/02* (2006.01)
*G06F 9/44* (2018.01)
*G05B 19/05* (2006.01)

(52) U.S. Cl.
CPC ........... *G05B 23/0254* (2013.01); *G06F 9/44* (2013.01); *G06N 5/025* (2013.01); *G06N 20/00* (2019.01); *G05B 2219/32352* (2013.01); *Y02P 90/02* (2015.11)

(56) References Cited

U.S. PATENT DOCUMENTS

2010/0083270 A1* 4/2010 Kline ................ G05B 19/4187
 718/104
2012/0030646 A1* 2/2012 Ravindran ................ G06F 8/20
 717/105
2016/0054720 A1* 2/2016 Lo ........................ G05B 19/056
 700/87

OTHER PUBLICATIONS

Bochenek, R., et al. "Studies in Adaptive Random Search Optimization for MINLP Problems" Computers & Chemical Engineering Supplement, pp. S483-S486 (1999) (Year: 1999).*

Pontin, Jason "Greedy, Brittle, Opaque, and Shallow: The Downsides to Deep Learning" Wired, (2018) available at <https://www.wired.com/story/greedy-brittle-opaque-and-shallow-the-downsides-to-deep-learning/> (Year: 2018).*

* cited by examiner

AUTOMATIC MODELING FOR MONITORING, DIAGNOSTICS, OPTIMIZATION AND CONTROL

BACKGROUND

The invention relates generally to real time analytics in applications such as the industrial monitoring and control through the use of modular tools that can be called upon and combined as needed to address monitoring and control problems as they arise in such environments.

Many sophisticated monitoring and control approaches have been developed and are presently in use for automated control of industrial machines. At one time these were based upon analog and digital components, but increasingly they rely upon programmed computers, and particularly upon automation controllers to implement control schemes developed for particular applications. Such schemes may be based upon dedicated programming, and in many cases make use of models based on the physics, characteristics, performance, and interactions between automation components and the products they are applied to make or process. Historically, such models were developed specifically for each machine, and any optimization or special programming was carefully adapted and refined over time. In many cases, both design and run-time environments were used where models and related programming required adaptation and refinement.

Generally, a control system may facilitate controlling operation of a process, for example, in an industrial plant or an industrial automation system. In some instances, the control system may utilize a model predictive control (MPC) system to optimize performance of the process by generating and manipulating a process model to transition the process from a current operating state to a desired operating state over a control horizon (e.g., future time steps). However, the need for computational efficiency of near real-time optimization may cause the MPC system to significantly simplify the process model to the detriment of the model quality and controller performance. Additionally, typically, the MPC system accesses and/or maintains the models (e.g., mathematical representation of the process), which may not be desirable to certain entities responsible for aspects of the process.

Whether MPC or other modeling techniques are employed, it would be useful to develop useful tools for routine operations needed during monitoring and control in industrial environments. It will be particularly useful if these were relatively agnostic, in the sense that they are not directly tied and limited to the particular application, vertical market, controlled machines and processes, and so forth, but could flexibly adapt to many applications and control problems, and provide improved performance. There is a particular need for modular tools that provide adaptive modeling, optimization, classification (e.g., resulting in alarms or insightful analysis), and control operations. Moreover, it would be greatly advantageous if such modules could be employed both in parallel and in series to address combined modeling and optimization problems, modeling problems at multiple levels, optimization problems at multiple levels, modeling and classification problems in combination, modeling, optimization, and control problems, and so forth.

The present techniques are intended to address such needs.

BRIEF DESCRIPTION

In accordance with certain aspects of the disclosure, a system comprises a plurality of sensors that, in operation, sense operational parameters of a controlled machine or process, and a plurality of actuators that, in operation, control operation of the machine or process. An automation controller is coupled to the sensors and the actuators, that, in operation, controls the machine or process via the actuators based upon feedback from the sensors and based upon a model of at least a part of the machine or process. An annotator receives input data derived from the sensed data or from data generated by the automation controller and that annotates the input data to produce annotated input data. An analytics engine is executed by a processor, and receives the annotated input data and generates the model, based upon an agnostic model stored in a memory and upon the annotated input data. The agnostic model comprises a set of base functions that are used to build the model from variables of interest. The analytics engine extracts physical features of the system represented by the annotated input data.

DRAWINGS

These and other features, aspects, and advantages of the present invention will become better understood when the following detailed description is read with reference to the accompanying drawings in which like characters represent like parts throughout the drawings, wherein:

FIG. 1 is a diagrammatical representation of an industrial automation system employing modular tools for modeling, optimization, classification and control;

FIG. 2A a is a diagrammatical representation of exemplary circuitry that may be included in the system of FIG. 1;

Figure 6:
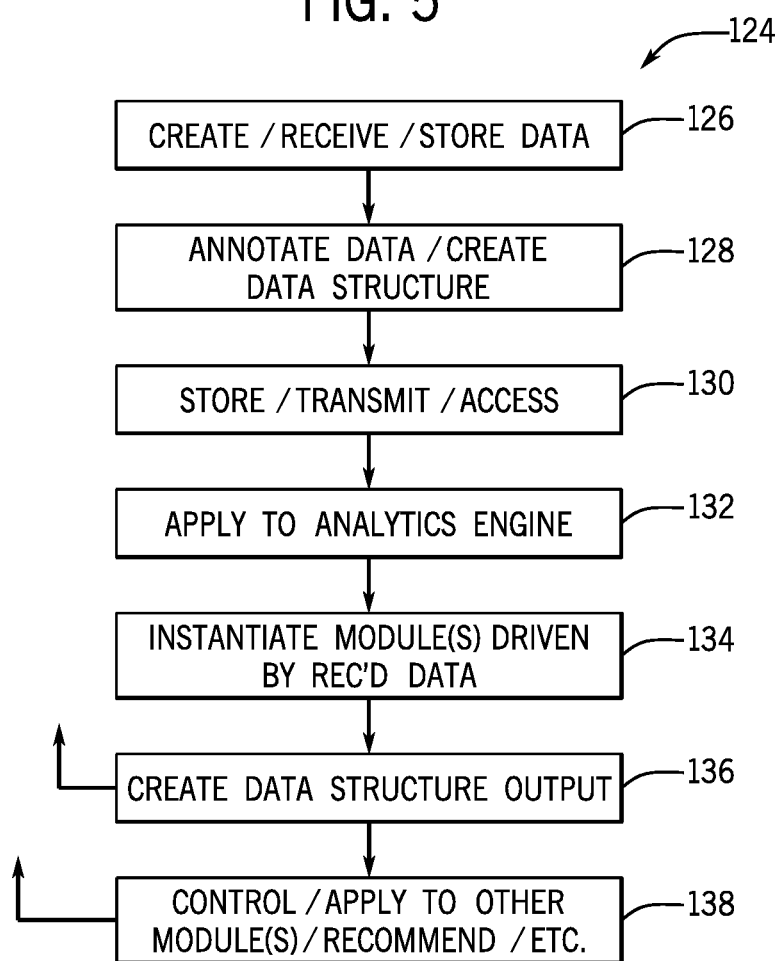
Figure 7:
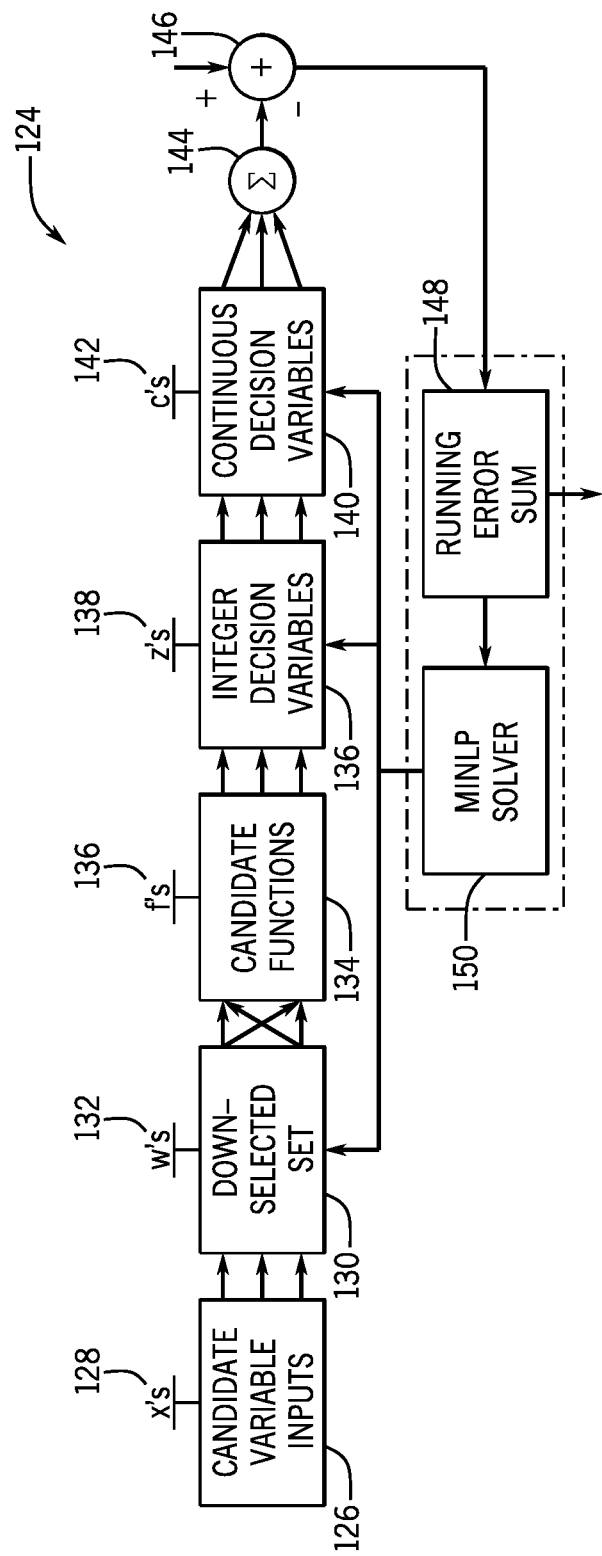
Figure 8:
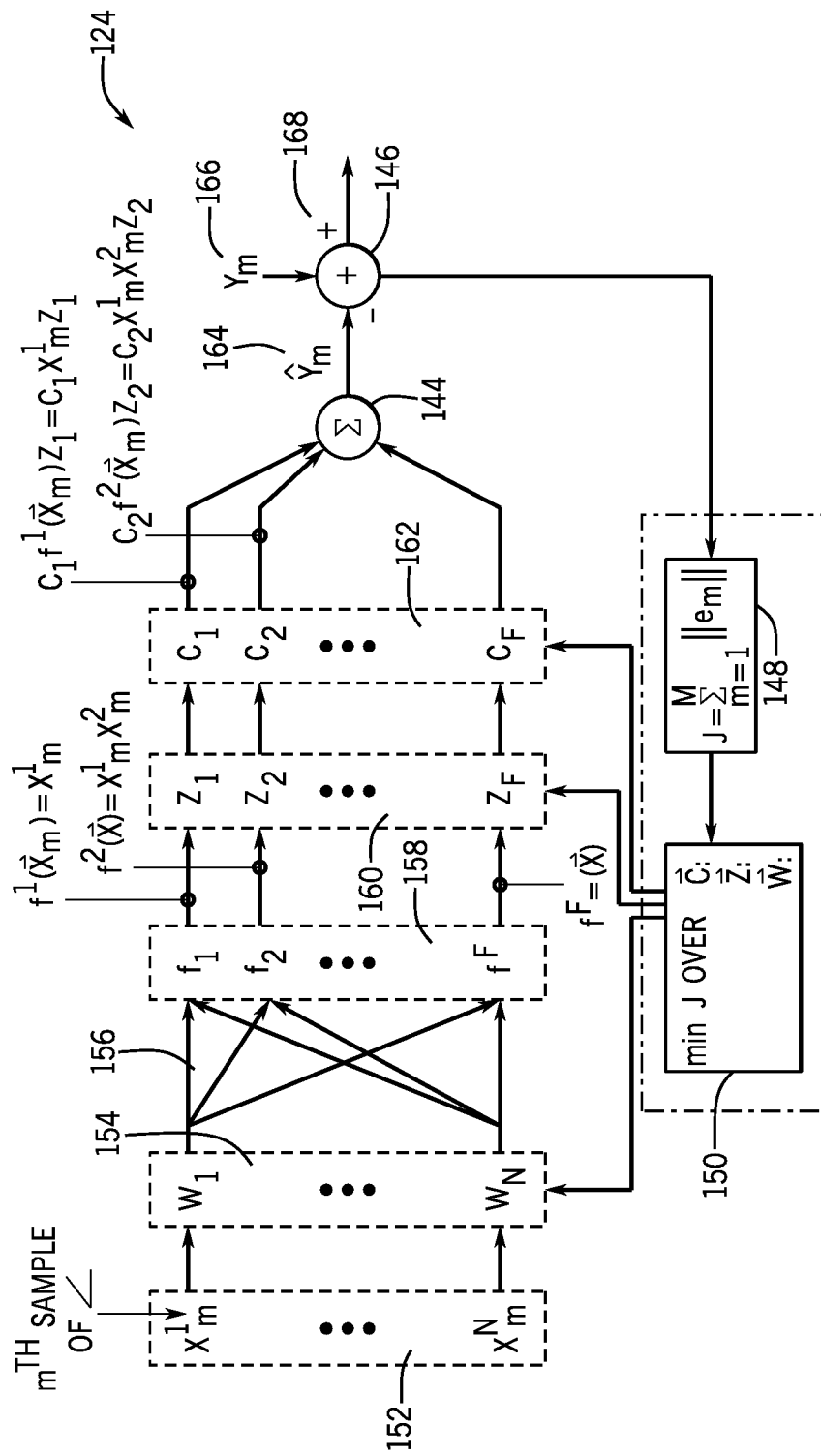
Figure 9:
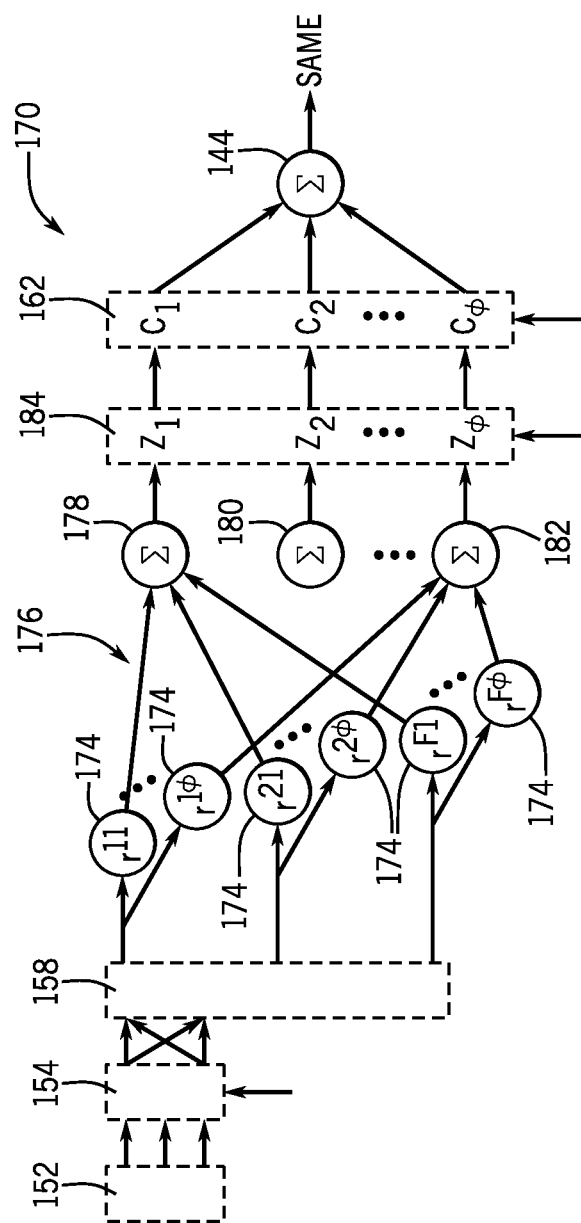
Figure 10:
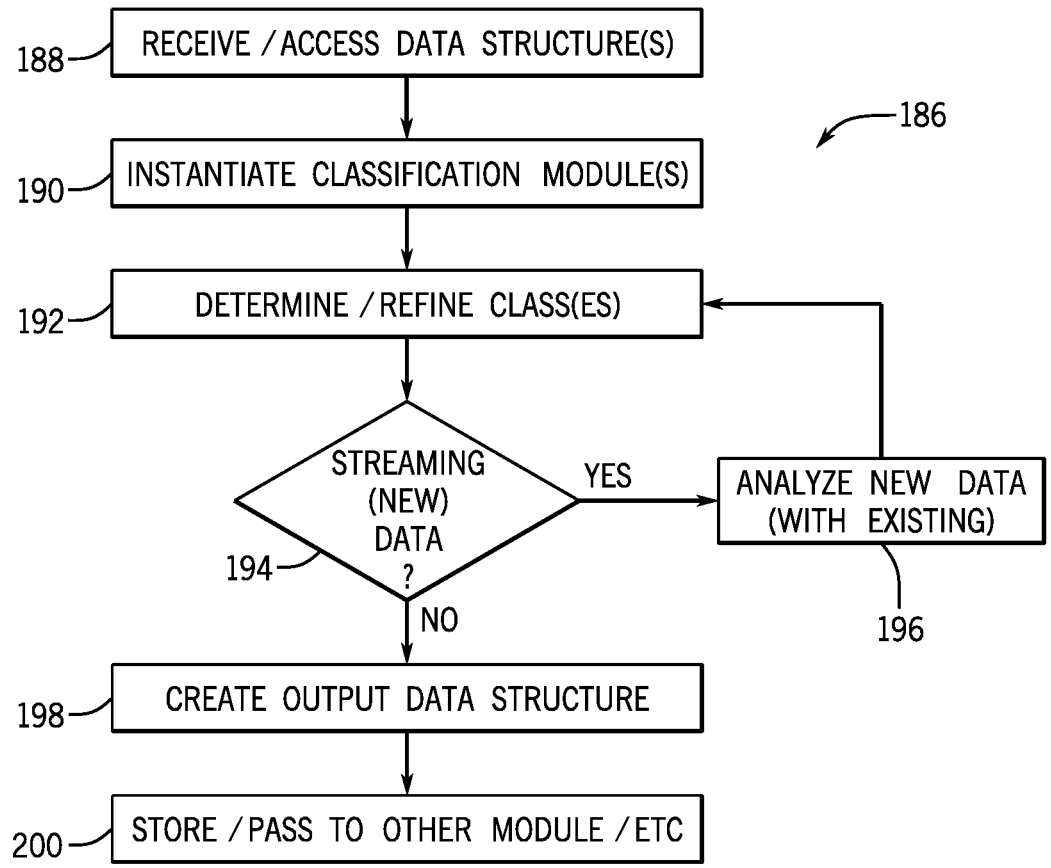
Figure 11:
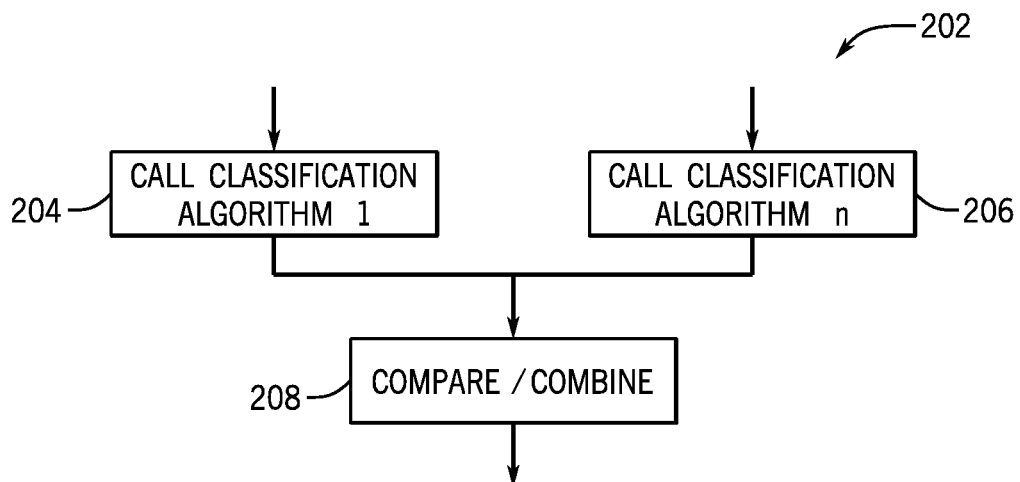
Figure 12:
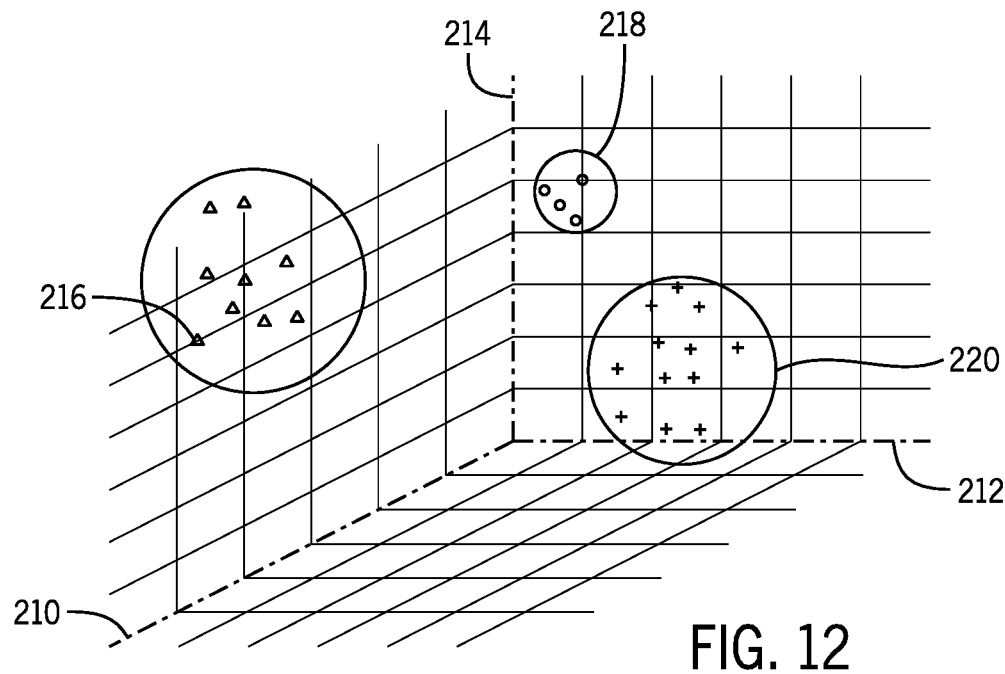
Figure 13:
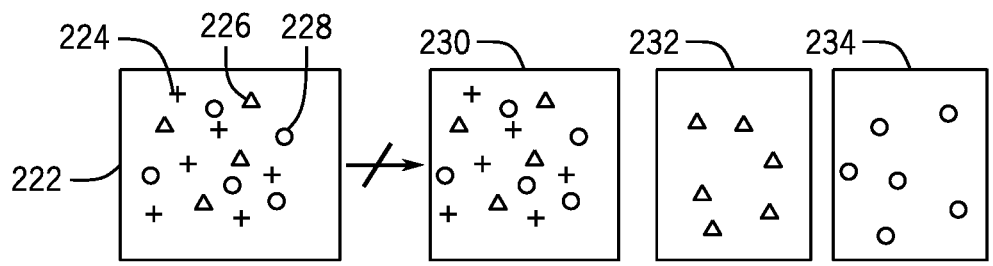
Figure 14:
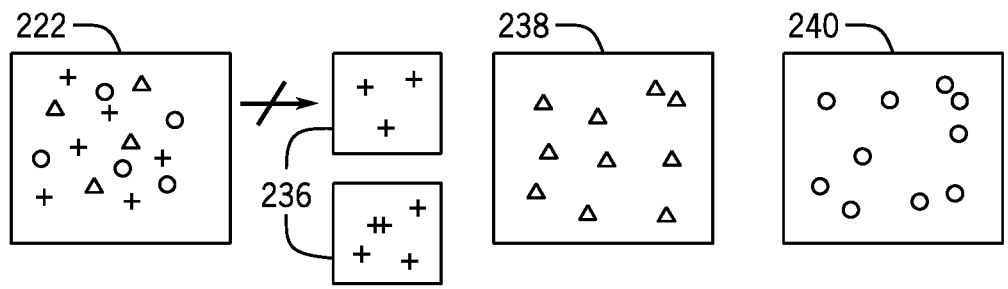
Figure 15:
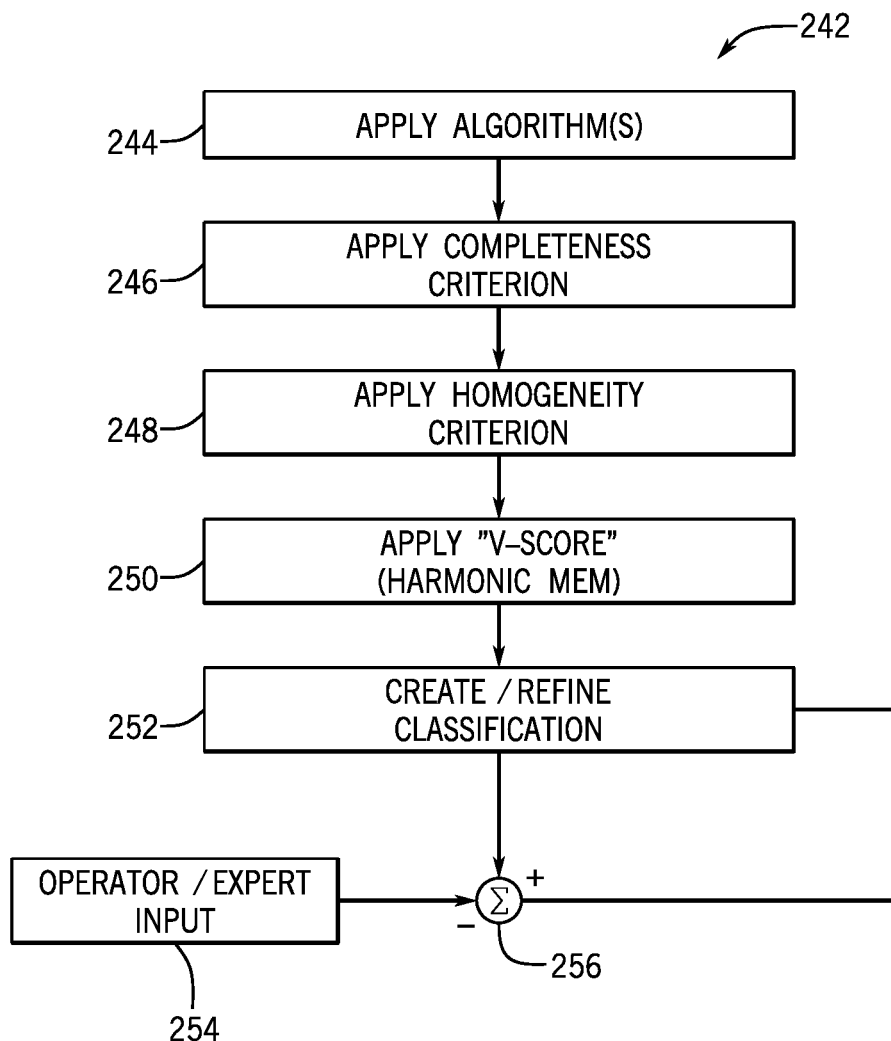
Figure 16:
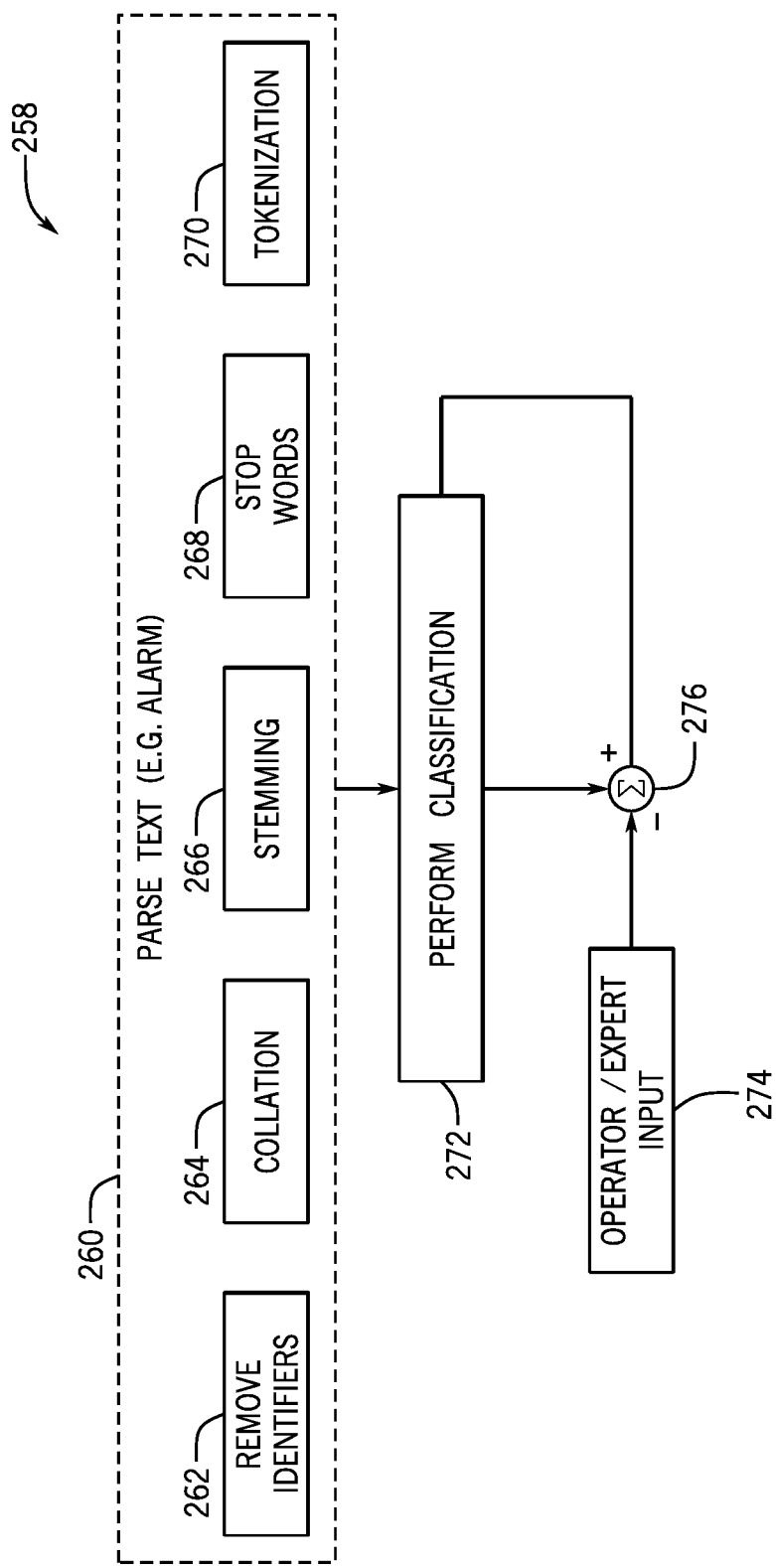

FIG. 6 a flowchart illustrating exemplary logic for instantiating one or more of the analytics modules for monitoring and/or control of an industrial machine or process;

FIG. 7 is a diagrammatical representation of an exemplary embodiment for a modular analytics engine modeling technique;

FIG. 8 is a more detailed representation of the scheme of FIG. 7;

FIG. 9 is a diagrammatical representation of a particular implementation of the module of claim 8;

FIG. 10 is a flowchart illustrating exemplary logic for performing classification analysis in accordance with the present techniques;

FIG. 11 is a similar flowchart illustrating applications of multiple algorithms in combination for classification;

FIG. 12 is an exemplary illustration of multi-dimensional classification;

FIGS. 13 and 14 are examples of erroneous processing that may be avoided through the present techniques;

FIG. 15 is a flowchart illustrating exemplary textual classification that may be performed by the analytics engine, and FIG. 16 is a flow chart illustrating one embodiment of such textual classification.

DETAILED DESCRIPTION

Industrial automation systems are often used for automated operation of a machine or process, for example, factories, material handling facilities, transportation facilities, vehicles, and many different environments. Some such systems may make use of models of the machines, processes, products, and enterprises that serve as a basis for determining control actions to be taken, corrective actions needed, analysis of performance, and so forth. One example, is the use of process models in model predictive control (MPC) that uses a model of the process to predict system response to control actions and uses an optimization engine to determine desirable control actions to apply to the process based upon the model. Given the critical role of the automation system, secure, robust, and timely operation of the system in any real-world scenario may benefit from an analytics engine module that utilizes process, product, and enterprise model.

Another example is when, a more or less complete process model is made available to an optimization engine used in MPC control systems for a structured search that determines optimal control moves over a desired control horizon (e.g., future time steps). The optimization engine may apply candidate moves to the process model to anticipate potential process response and then choose the moves that result in an anticipated process response that is optimal in some sense.

However, in most cases the machine or process models are developed a priori, and implemented after some adaptation to the specific application. Any subsequent refinement of the model for use in optimization schemes, control schemes, or any other aspect of the automation system operation is done in parallel, typically with significant manual input and programming, followed by testing well prior to implementation in the actual working system. Accordingly, some embodiments presented in the present disclosure, more flexible approaches are proposed that allow for deployment of "modular" analytics engines including engines for modeling, optimization, classification and control such that each module is capable of modifying its output and its interface to other modules at least based on measured operation data and additional data structures that provide application context for the operation data. The term "modular" is intended to mean that the programmed tools, executed by one or more processors, is launched, run, and/or instantiated on an as-needed basis, and may perform the desired tasks at least partially independently of ongoing monitoring and control operation on the controlled system or process. The term also implies that where different types of "modules" are provided, such as for modeling, optimization, classification, and control, these may be separately instantiated and executed, and similar modules (that is, executing different modeling, optimization, classification and control problems) may be instantiated in parallel, or in any desired cascaded or series approach. For example, instantiation of a classification module may serve to feed data into a modeling module, which in turn may provide output for an optimization module, and thereafter for control. Similarly, the same "type" of module may feed other modules of the same type, such as a modeling module working out a model for part of a machine or process that is used by another modeling module for a higher level in the machine or process, or even at an enterprise level utilizing the output of the lower level modeling.

The disclosure also relates to "agnostic" modules, where possible. That term is intended to imply that the module programming is not limited to a specific type of machine or process, but is much more generic, and can automatically adapt the modeling, optimization, classification, and control to any type of input data, problem, system, or process. In most cases, little or no prior or special knowledge of the machine, the process, the product, or the environment are needed.

Further, in accordance with aspects of the contemplated technology, the modular tools may be "data-driven". That is, the executable routine that comprises each type of tool is instantiated based upon received data. In some embodiments, the data is provided in an annotated form that allows for context in the operations performed by the modules. In these embodiments, a data structure is defined that is used to initiate execution of one or more of the modules, and that is used as input or the initial data set used for solving the problem posed. Similarly, the modules may be adapted to output a similar data structure, making interpretation and use of the results uniform, and allowing one module to feed another, where appropriate. One or more annotation engines, interpretation engines, and so forth may be used to facilitate this process, and some of these may require little or no human intervention. Indeed, the "data-driven" aspect of the approach may mean that human operators, though potentially aware of the instantiation and operation of the module(s), do not need to be directly involved with launching them, or monitoring their computational progress. At the same time, of course, human intervention or control may be involved at key points in the process, such as before inclusion of improvements or adaptations in actual monitoring and control.

In some of the present disclosure, reference will be made to "analysis engines" or similar tools. Those skilled in the art should recognize that these are the modular executables that allow for processing of the input data, and that may perform operations such as accessing data, requesting data, determining which data is useful in resolving a problem posed by the processing problem, determining possible mathematical and analytical structures that may be useful for modeling, optimization, classification, and/or control, and outputting results that may be used or referred to by the same or another processor, or by engineering or management personnel for improved monitoring and control of the machine or process under consideration.

For some of the processing, such as optimization, some embodiments enable an open modeling architecture where the optimization module does not have a complete definition of the process model. One solution that removes the complete model definition from an optimization engine is described in detail in U.S. Pat. No. 9,292,012, issued on Mar. 2, 2016 to SayyarRodsari et al., and entitled Secure Models for Model-based Control and Optimization which is incorporated herein by reference in its entirety for all purposes. However, the present disclosure extends the concept to enable modular analysis engines to perform different operations on input data structures in a modeling language (e.g., C, C++, Python, Matlab) that is most appropriate for that particular module.

In general, models of physical processes developed and used for the present purposes may be broadly categorized as first-principles (phenomenological, physical, mechanistic) or empirical (statistical, data-centric). A first-principles (FP)

model commonly consists of a set of equations describing known relationships among the variables, with coefficients or other parameters that may be fitted to data. Empirical models presume no particular form for the relationships, and instead fit input/output models from data alone. Neural networks (NN) models, which employ a large number of parameters in a universal approximation structure, are one of the most widely used forms of nonlinear empirical modeling methods due to their many favorable properties. In some embodiments, the models may include parametric hybrid models that combine the two modeling approaches. That is, the parametric hybrid models may include steady-state and/or dynamic models whose parameters are also described as models. For example, the parametric hybrid models may include using parametric input/output or state space dynamic models in the form of a system of continuous differential equations or discrete difference equations, and the parameters may be static mappings captured by neural networks (e.g., using empirical data) to enable fast updating to the parametric hybrid models. Further, each of the models may be expressed in modeling languages that are suitable for the intended purpose of the models. In this way, the models may be computationally optimized and are not limited by a particular modeling language that is uniformly applied regardless of the function of the model.

However, as discussed below, the agnostic and data-driven approach proposed will generally require no specific knowledge of the system type or even the particular physics of the process. Rather, once the input data structure is developed, the modeling module may be instantiated and work to develop a workable model (or to refine a model). Similarly, optimization operations may not require specific knowledge of the model or the process being optimized. Classification, which may be based on different types of analytical approaches, may similarly be partially or entirely agnostic of the underlying physics of the terms, events or data being classified. And the same is true of control, which may be based on the output or one or more of the other modules. While obviously desirable, a completely data-driven modeling engine that consumes operation data without a data-conditioning step performed by a human has proven a significant challenge. A key innovation in current disclosure is to select a modeling paradigm that is inherently more resilient to the oddities in the data.

Figure 1:
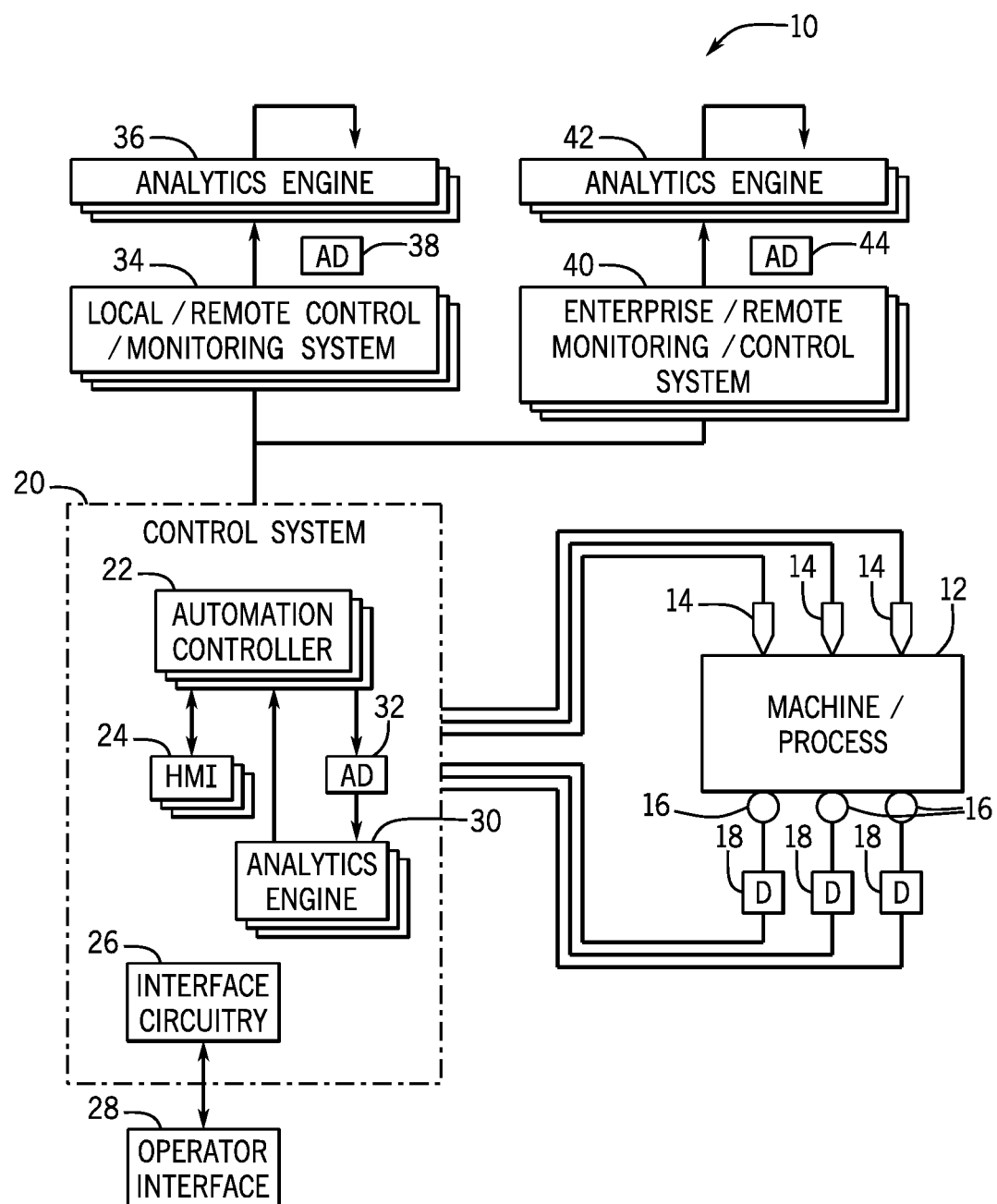

FIG. 1 is a diagrammatical representation of an industrial automation system 10 applied to a controlled machine or process 12. In some embodiments, the machine or process 12 may be any conceivable type, such as a manufacturing process, a steady state process, a batch process, a chemical process, a material handling process, an energy utilizing process, an energy production process, or any combination thereof. The machine or process 12 is illustrated as comprising a plurality of sensors or measurement devices 14 and actuators 16. The sensors may, of course, detect or measure any relevant parameter, including physical parameters, electrical parameters, manufacturing data, product data, engineering data, management data, and so forth. The actuators may similarly perform any desired functions, but in many cases will include motors which are controlled by drives 18 that provide controlled electrical power adapted for regulating operation of the machine or process. The sensors and actuators are coupled to a control system 20 that, in operation, receives feedback from the sensors and, based upon monitoring and control programming stored in the control system, issues control commands to the operators.

In the illustrated embodiment, the control system comprises one or more automation controllers 22 which in most cases may be a specialized computer or processor adapted to execute control routines in real or near that real time. The automation controller may be coupled to one or more human machine interfaces or HMIs 24 to allow interaction by operators. Interface circuitry 26 allows for data to be exchanged with external devices, physically proximate to the control system, proximate to the machine a process, or at any remote location, such as in a control booth, office, or any other remote location. Where desired, such operator interfaces may be coupled to the system through any desired networking, wired or wireless. Moreover, one or more analytics engines 30, which as discussed in the present disclosure may comprise modular, agnostic, updated-driven programming are coupled to the automation controller to receive annotated data in the form data structures, as indicated by reference numeral 32 in FIG. 1.

In the automation system 10 may control operation of the machine or process by outputting control signals to instruct one or more components to implement control actions (e.g., manipulated variable set points). The automation system may be coupled to the components via any suitable network (e.g., Internet, DeviceNet, Ethernet/IP, ModBus, ProfiBus). In some embodiments, the components may include controllers, input/output (I/O) modules, motor control centers, motors, human machine interfaces (HMIs), operator interfaces, contactors, starters, drives, relays, protection devices, switchgear, compressors, scanners, gauges, valves, flow meters, and the like. For example, an automation controller or motor drive may instruct a motor to actuate at a particular speed (e.g., a manipulated variable set point).

Furthermore, controllers may determine manipulated variable set points based at least in part on operational parameters (e.g., temperature, pressure, electrical power, or flow rate) determined via one or more sensors. More specifically, the sensors may communicate measurement signals informing the automation system of the determined operational parameters. The operational parameters will typically include information enabling the automation system to determine a current operating state of the machine or process (e.g., current manipulated variables and/or controlled variables).

In some embodiments, the controllers may employ the computing power of other controllers to perform functions. For example, a first controller (e.g., a hybrid model predictive controller, for which the decision variables include both integer and continuous variables and the search process solves a mixed integer linear or nonlinear programming problem) may utilize a second controller to determine a search result for a first optimization search branch and a third controller to determine a search result for a second optimization search branch. The first controller may then compare the search results returned by the second and third controllers to select the better (e.g., less costly) search result as the criterion for its branching function in the course of its mixed integer linear or nonlinear optimization.

Furthermore, the controllers employed by the automation system may facilitate enabling different types of control schemes. For example, the control system 20 may include one or more model predictive control (MPC) devices, one or more proportional-integral-derivative (PID) controllers, one or more neural network controllers, one or more fuzzy logic controllers, or any combination thereof. Generally, in each of the various control schemes, the automation system may determine manipulated variable set points based at least in part on tuning parameters. For example, in a PID control system, the automation system may utilize tuning parameters, such as a proportional gain, an integral gain, and a derivative gain. Additionally, in a MPC control system, the automation system may utilize tuning parameters in an objective function to weight aspects of the machine or process. For example, the tuning parameters may weight deviation of a controlled variable from a desired value, deviation of a manipulated variable form a desired value, and change in the manipulated variable. Where optimization is desired, the automation system may determine manipulated variable set points and/or determining a current operating state of the machine or process by generating a computationally optimized process model (COPM) and performing simulations on the COPM.

Regarding the physical hardware of the systems, the processing circuitry and devices may include one or more general purpose microprocessors, one or more application specific processors (ASICs), one or more field programmable logic arrays (FPGAs), or any combination thereof. The memory circuitry and devices may include random access memory (RAM), read only memory (ROM), rewritable flash memory, hard drives, optical discs, and the like. In some embodiments, unified access modules (UAMs), may function as interfaces between various component programming modules. For example, the UAMs may function as the interface between analytics engine modules that utilize output from one another. The components of the automation system may be in communication with one another via wired (e.g., Ethernet) or wireless (e.g., WiFi, Bluetooth®, ZigBee) connections, and may use any suitable network (e.g., Internet). In some embodiments, the execution of the automation system may be distributed.

In the illustration of FIG. 1, the automation system is further connected to on- or offsite local and/or remote monitoring and control systems as indicated by reference 34. Such systems may themselves include processing capabilities as well as analytics engines 36 of the type included in the automation system. Thus, similar analysis of data may take place at these systems based upon the same or different annotated data sets 38. Similarly, other remote monitoring and/or control systems 40 may be provided, such as at other institutional levels, here referred to as an enterprise level. Such systems may include further analytics engines 42 that act on annotated data 44 to perform their own analysis. As discussed below, the analyses performed at these different levels may be done in parallel, or may act upon lower (or more generally, different) level analysis, such as from the control system. (It should be noted that "lower" levels, that is, those closer to the actual control base of the machine or process, may similarly act on output from a "higher" level analytics engine.) The analytics engines 30, 36 and 42 are illustrated as returning data to the systems to which they are connected. In practice, output from these engines may be stored, communicated to human operators, communicated to the same or different controller or monitoring equipment, and so forth, or may be a communicated and/or used by multiple of these, at the same or a different level.

Figure 2A:
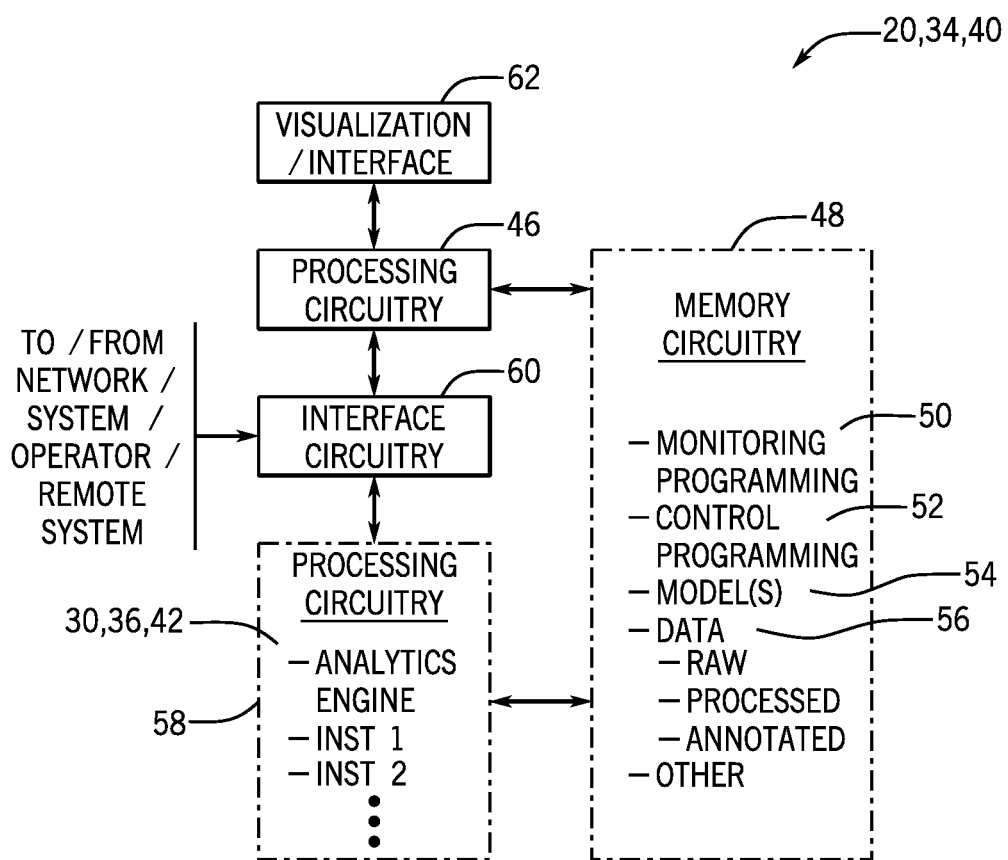
FIG. 2B is a diagrammatical representation of an implementation of the system in which a control component for modular tools is provided on a data backplane.
FIG. 2C is a diagrammatical representation of such a system in which an analytics engine providing the desired modular tools is executed by a dedicated core of a multi-core processor.

Many different physical configurations may be envisaged for the control systems and analytics engines contemplated in the present context. FIG. 2A, for example, illustrates a first configuration in which processing circuitry 46 is provided with memory circuitry 48, where programming and data are stored that are acted upon by the processing circuitry during operation of the machine or process. In the illustrated embodiment, a number of different types of programming and data are provided in the memory, such as monitoring programming 50, control programming 52, one or more models 54, and system data utilized by the programming and models as indicated by reference 56. Such data may include raw data from sensors, partially or fully processed data (typically based on computations made from the raw data), annotated data (adding a context to the raw or processed data), and so forth. As will be appreciated by those skilled in the art, the processing circuitry 46 executes the stored programming in real or near-real time based upon received feedback from the sensors to provide control commands for the actuators in accordance with the machine or process design and function.

The illustrated embodiment of FIG. 2 further includes additional processing circuitry 58 designed to implement the analytics engines. As illustrated, the processing circuitry may instantiate the particular analytics engine modules as needed, and based upon data received from either of the memory circuit 48 or interface circuitry 60 connected to the processor 46. The interface circuitry 60 may be further coupled to one or more networks to receive inputs, provide outputs and exchange data, for example. In some implementations the processing circuitry 58 may be the same as processor 46, but modules are instantiated only on an as-needed basis, typically independent of the routine operation of the monitoring and control functions. As discussed below, in other cases the processing capabilities for the analytics engine modules may be separate and distinct. Thus, depending upon the level of implementation, the processing circuitry for the analytics engine modules may comprise an automation controller, a separate computer, computing resources at a remote or enterprise level, or even third-party resources. Finally, one or more visualization or interface devices 62 may be coupled to the system, such as an HMI, computer terminal, or any other human or machine interface.

Figure 2B:
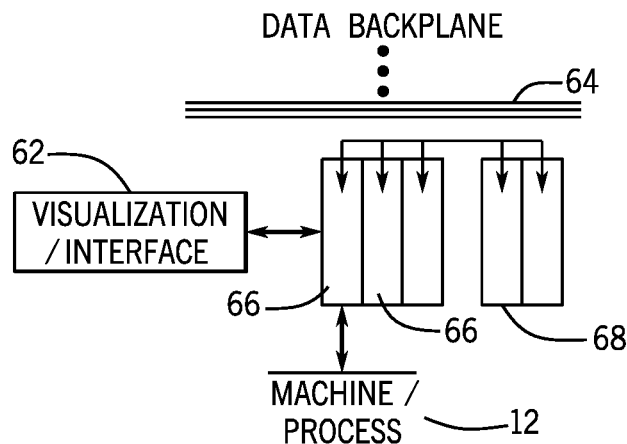
Figure 2C:
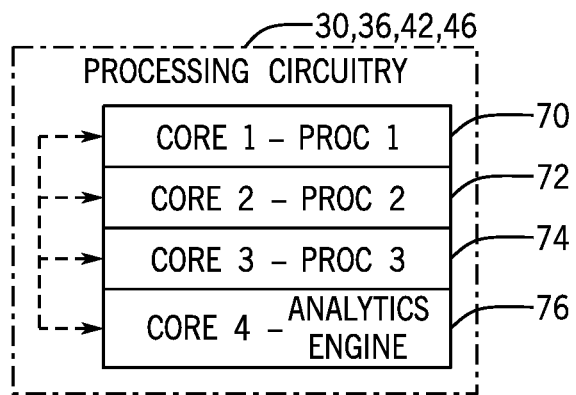

FIGS. 2B and 2C illustrate two exemplary of physical level implementations for processing capabilities for the analytics engines. In the illustration of FIG. 2B, for example, a data backplane 64 is provided over which multiple automation components may communicate. As will be appreciated by those skilled in the art, such backplanes may allow for physical mounting of modular devices, such as automation controllers 66, input/output devices, and so forth. In the illustration, a dedicated analytics engine module 68 is provided in which processing circuitry, memory circuitry, communications circuitry and so forth are included. Data communication over the backplane 64 allows for any raw, process or other data to be accessed by the analytics engine module 68 when one or more of the of analytics engine modules is instantiated. Output from the physical module may also be communicated via the data backplane. In the illustration of FIG. 2C, on the other hand, processing circuitry is based upon a multi-core processor that may have different cores dedicated to different functionalities performed during operation of the machine or process. For example, a first core 70 may perform control tasks, while a second core 72 may perform data analysis (e.g., vibration analysis), optimization, and so forth. A third core 74 performs other functions. The analytics engines are instantiated and executed by a fourth core 76 in the illustrated embodiment. Such multi-core automation controllers are available, for example, for Rockwell Automation under the commercial designation "Epic".

Figure 3:
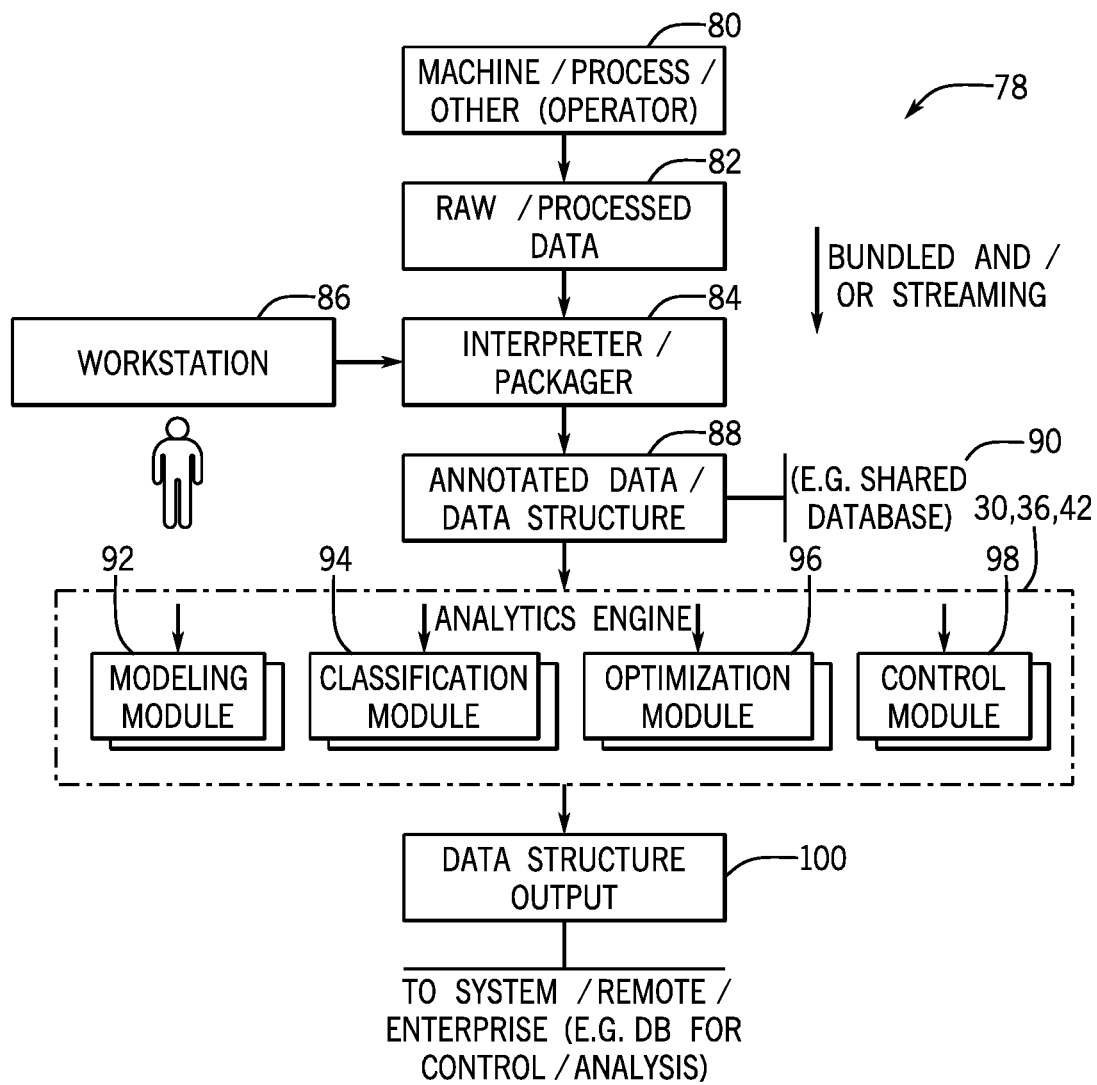
FIG. 3 is a diagrammatical representation of an analytics system incorporating multiple modular tools for modeling, classification, optimization, and control.

FIG. 3 is a diagrammatical illustration of one exemplary implementation of an analytics system 78 that includes multiple analytics engines that may be instantiated and operated on a data-driven basis as discussed in the present disclosure. As illustrated in the figure, the system 78 may be based upon a data source such as a machine, process, operator, or various remote sources from which data will be provided. Although reference is made in the present discussion to real or near-real time operation of the analytics engines during actual monitoring and/or control of a machine or process, it should be noted that the sources 80 may provide data for analysis in any desired time frame, both during actual operation of the machine or process, and separate from any such operation. That is, the operations performed by the analytics engines need not be time-critical for control functions. Sources 80 are illustrated as producing raw or processed data 82. Consistent with the timing of instantiation of the analytics engines, it is contemplated that the data may be bundled and/or streaming. That is, certain analyses may be performed somewhat independent of the real time operations of the machine or a process, and in such cases, data may be bundled so that the analysis can be performed at any convenient time. Where data is readily available and continuing, however, the system may equally well operate based upon streaming data which is communicated and updated on an ongoing or periodic basis.

The data is provided to an interpreter/packager 84 where it may be packetized, compressed, processed, and so forth for use and later operations. An operator workstation 86 may be provided to assist in this process, such as by partial or fully manual manipulation of the data. Such manipulation may include, for example, naming of the data, selection of the data, selection of one or more parameters or variables of interest, computations made on the data, tables, databases, and other formats, and so forth. As a result of such operations, a data structure is produced that may be referred to as annotated data, as indicated by reference numeral 88. Any suitable data structure may be used for this purpose. For example, one contemplated data structure is the user-defined data types (UDTs) allowed by the Logix platform of Rockwell Automation. Other possible data structures are those created by Azure tables in cloud environments by platforms available from Microsoft. Still further JavaScript Object Notation or JSON data structures may be utilized. But it should be realized that the particular type of data structure is not limited here, and any annotated data structure capable of being interpreted and utilized by the analytics engine modules may be used. The data structure may be stored, such as in a shared database 90 for use by one or more of the analytics engines.

Based upon the annotated data structure, one or more of the analytics engines may be instantiated and operates upon the received data structure. In the illustrated embodiment these include a modeling module 92, a classification module 94, and optimization module 96, and a control module 98. Each module may be instantiated any number of times, including more than one time operating in parallel with other modules and with instantiations of same module. Once the module has completed the desired analysis, a data structure of the same type as the one the module received, or of any desired other type is created as output as indicated a block 100 and FIG. 3. This output may then be stored, or may be provided to any other device that may use it, or to a human operator. In certain embodiments, the output may be provided to other modules of the same type or to modules of a different type operating in the same device. In other embodiments, as noted above, the output of analysis at one level could be provided to analytics engines of a similar or different type at other levels.

Figure 4:
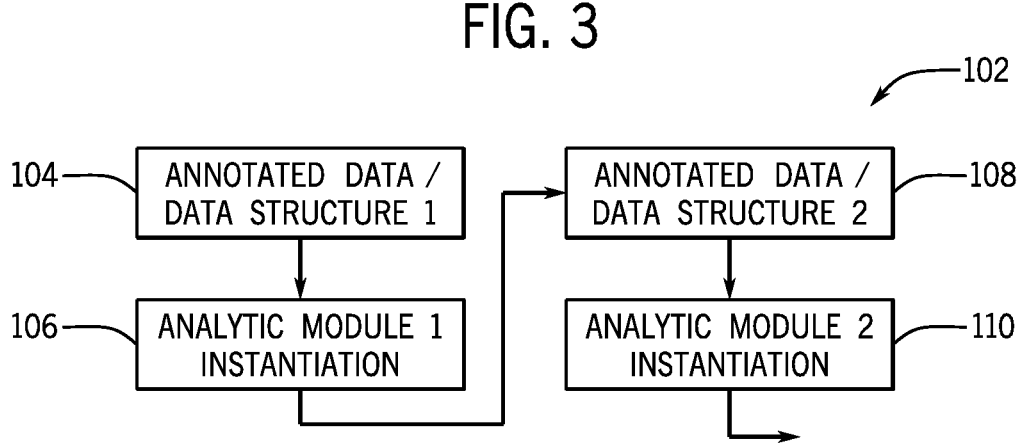
FIG. 4 is a diagrammatical representation of a cascaded or sequential implementation of such modular tools.

FIG. 4 illustrates a cascaded or sequential implementation of the analytics engines. The operation 102 may begin with creation of an annotated data structure as indicated at block 104. As noted above, this annotated data, in a desired structure form, may be provided to a first analytics engine to instantiate the analytics engine to perform the desire operations. This first instantiation, indicated by reference numeral 106 will return a subsequent data structure comprising annotated data as indicated by reference numeral 108. This subsequent data structure may be used as input to a subsequent instantiation of the same or different models at block 110. By way of example, any combination of the modules may be used in this manner, such that for example, a modeling operation may follow the previous modeling operation, a classification operation may precede a modeling operation, a model may be developed for use in an optimization operation, modeling and optimization may precede a control module, and so forth.

As also noted above, the overall system may include multiple levels, typically including a machine level at the bottom, where actual machine operations are performed, feedback is received, and control commands are generated based upon operation of the machine in real or near-real time. Other levels may include machine systems in which the lower level is merely one part. Still further levels may include production lines, handling lines, factory departments, entire factories, and so forth. Further elevated levels may include whole institutions, firms, manufacturing enterprises, and so forth. In certain situations, it may be useful to model operations, optimize performance, classify data, or control machines and processes at any one or more of these levels based upon inputs from other levels. For example, machines may be controlled to provide production or to improve efficiency based upon enterprise-level information regarding material flow, orders, personnel availability, market conditions, and so forth. In certain enterprises, moreover, analysis, modeling, optimization, and so forth at an enterprise level may be useful to determine machine productivity, maintenance needs, and the like. The present techniques allow for implementation of the analytics engines in this way.

Figure 5:
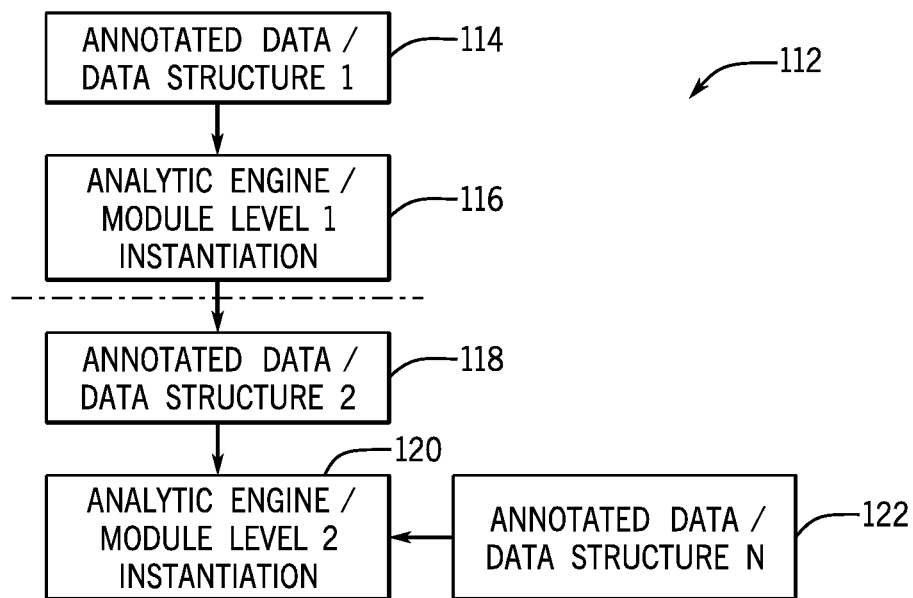
FIG. 5 is a diagrammatical representation of multilevel implementation of such tools.

The multi-level implementation 112 illustrated in FIG. 5 may proceed by the establishment of annotated data in a data structure as indicated by reference numeral 114. The data structure and the data selected and annotated will typically correspond to the variables, inputs, and data required for the analysis at that level. At block 116 one or more analytics engines is instantiated at the first level and perform the desired analysis, returning and annotated data structure of 118 as output. This data structure may be stored and/or communicated to another level in the enterprise where a further analytics engine is instantiated based on the data structure, as indicated a block 120. As noted in FIG. 5, the analytics engine instantiated a block 120 may utilize the data structure 118 as well as other data structures from the same or different levels has indicated a block 122. Such multiple data structure inputs may be useful for compiling data, comparing data, and so forth at higher or enterprise levels.

FIG. 6 generally illustrates a logical flow 124 of execution of one or more of the analytics modules. As noted above, the of process begins with creating, receiving or storing data from the machine or process, or from or by any external source or from human operators as indicated block 126. At block 128, selected data is compiled and annotated to create the desired data structure. Because the process is data-driven, the data structure is submitted to the analytics engine modules, and at least one of the modules is instantiated by the storing, transmission, or access to the data as indicated at block 130. The data is applied to the analytics engine at step 132, then, resulting in instantiation of the one or more modules at step 134. The instantiated module then performs its function, resulting in a model, a classification or proposed classification, a proposed optimization scheme, or a proposed control scheme, or multiple ones of these depending upon the instantiated modules, and a resulting data structure is created at block 136. This data structure may be stored and/or passed on to other parts of the system as indicated by the return arrow from block 136. Subsequently, control actions, recommendations, and other actions may be performed as indicated a block 138 based upon the model output.

FIG. 7 represents an exemplary analytics engine for modeling a system, process, or any part of a machine or process. In many industrial automation applications, building a suitable model for the application has proven a main obstacle to the wider adoption of model-based technologies such as effective model-based monitoring and control. A machine or process model is often a compromise between model quality/accuracy and computational efficiency/complexity. The expertise required to build the model and more importantly to maintain the model over time has been viewed as the key technical challenge especially in applications where local access to highly skilled workforce is difficult (e.g. remote piping stations, drilling platforms, mining & minerals).

The proposed analytics engine modeling module may enable automated modeling of a process in a real-world scenario where extensive process know-how does not exist, which may eliminate the need for a human expert in the process. In general, the approach is based on automatically searching the available data space (e.g., available measurements) and identifying the variables that causally impact the variables of interest. A key differentiator in the proposed modeling module is the emphasis to use causality as the criterion for input variable selection. Simple reliance on correlation between input and output variables in a model when the human expertise is removed from modeling workflow could yield fundamentally flawed models that could not be trusted for real time use. The automatic search for variables causally related to a variable of interest could be expensive (computational resources and time), especially when the input space is large, so the proposed analytic engine significantly improves the efficiency and accuracy of the search for inputs that are causally influencing the desired output (i.e., modeled) variable. As summarized generally in FIG. 7, the process 124 begins, as outlined above, and as in the case of the other modules, with a data structure that is annotated, and may contain mined variables and parameters, and that may be established, checked, or filtered by a human operator, and these may become a listing of candidate variable inputs, as indicated by reference number 126. The variables 128 are thereby selected, and then a down-selected set is established as indicated at block 130. The down-selected variables 132 are then provided to candidate functions at step 134. As discussed below, the candidate functions 136 allow for many different relationships between the variables that may be useful in accurately modeling the machine or process, and may be selected to provide agnostic modeling with a limited number of actual relationships while providing excellent modeling results. In a further process, then, the candidate functions are applied to determine at step 136, down-select functions, as indicated by reference 138. From these, at step 140 model parameters 142 are determined. Then a summation is performed as indicated at 144 to bring these together, and at 146 a summation (difference) is determined between the resulting model and a feedback vector. The difference (error) is then used to generate a running error sum at block 148, and the result is applied to a systematic optimization procedure (such as mixed-integer nonlinear programming (MINLP) solver) 150. Output of this solver is then returned to improve down selection at block 130 and 136, and the model parameters at block 140.

In more detail, the functional dependencies between the identified causal inputs (i.e. $x=\{x_1, x_2, \ldots, x_C\}$ are identified, where C is the number of causally relevant inputs), and the target output variable (i.e. $y \in R$). It may be noted that the extension to a multi-output modeling where $y \in R^Y$ is straightforward. The identification of such functional dependencies includes the selection of a minimal set of basis functions, as well as the parameter value for the coefficients of the selected basis functions, as discussed below. More specifically, $\Phi_i$ and $\beta_i$ are identified such that F(x) defined as:

$$F(x) = \text{[summation from } i=1 \text{ to } \beta \text{ of]} \beta_i \Phi_i(x)$$

is a suitable representation of y. Note that $\Phi_i(x)$ is the i-th basis function defined on $x \in RC$, $\beta$ is the number of basis functions used, and $\beta_i \in R$ is the parameter corresponding to the i-th basis function. The systematic optimization problem formulated are therefore identifying both the variables to be included in the causal input set (i.e., $x_1, \ldots, x_C$), and the basis functions $\Phi_i(x)$ that map the input set to the output variable(s). The systematic optimization also determines the coefficient for each basis function that is included in the mapping.

Unlike prior art approaches where the input variable set and the basis functions are assumed as "given", the automatic modeling approach disclosed here provides a methodology for systematically identifying both as it is desired that involvement of an expert in the modeling process may be avoided. Moreover, the diversity of target applications may make it desirable to use a large pool of candidate basis functions especially when the number of input variables to the model is large. This disclosure considers the inclusion of algorithms that make the initial candidate pool for basis functions more intelligent. ☐Further, a smaller number of the candidate basis functions reduces the complexity of search space, and significantly improves the speed of the modeling algorithm. ☐

Another aspect of the approach is to minimize (ideally eliminate) the need for databases/historians in the automatic modeling process. In many applications, there is no data historian, and sometimes it is not even feasible/desirable to attempt to do so. In many remote and environmentally extreme circumstances the cost of data historian could be prohibitive. Rather, models may be determined online using steaming data. The algorithm allows for the use of historical data when it is available. When such history does not exist, however, the algorithm consumes streaming data and produces a measure of confidence in the model that will be used to judge whether model predictions are to be trusted. ☐To ensure the robustness of the models, the streaming data can not be processed without care for the validity and quality of data. A clustering-based data validation module (e.g., a classification module) may be used to process the streaming data prior to its use by the automatic modeling engine.

Moreover, ensemble data from multiple processes with similar behavior (for example data from all boilers in a plant) may be used to compensate for a lack of historical data for a single asset, and/or a lack of information content in the streaming/historical data (e.g., the unit is operated only under one operating condition and hence it does not contain the information to model the asset over its entire feasible operation range). A validation process may be tasked to ensure the ensemble data is indeed from fundamentally identical unit/process operations. The validation process could be very simple (check specific naming protocols for the variables and make sure comparable data is used for ensemble streaming). Automated data processing algorithms could be used to extract unit operation signatures that can be compared to ascertain compatibility.

Still further, the present approach allows for automatic modeling of both dynamic and steady-state behavior of a system. Automatic modeling of the dynamic systems follows principally a similar methodology. The key difference is that the basis functions for dynamic modeling may be properly defined and parameterized. More specifically, in one embodiment the dynamic response of a variable of interest as a function of a change in one or more input variables can be parameterized. A systematic optimization problem can then be formulated where variables causally affecting the variable of interest are selected at the same time that the parameters that define the dynamic dependency of the variable of interest on the said input variables are determined. One possible representation of the dynamic dependency is an input/output formulation such as:

$$Y(s) = (k_1/\tau_1 s + 1)U_1(s) + \ldots + (k_C/\tau_C s + 1)U_C(s)$$

where $u_1(t), \ldots, u_C(t)$ are the set of causal variables impacting output variable $y(t)$ over a time horizon over which the dynamic behavior of the system is observed. It may be noted that $k_1/\tau_1 s + 1$ is an example of a dynamic basis function that is determined by the systematic optimization search, and $k_1, \tau_1, \ldots, k_C, \tau_C$ are the parameters to be identified by the automatic modeling engine. Rigorous model validation may be used with historical data, streaming data, and automatically created simulated data to continuously validate and maintain the model.

Referring to the more detailed view of FIG. 8, a block diagram is provided for an exemplary data-driven, agnostic, modular analysis engine 124 for automatic modeling utilizing an MINLP approach. At block 152, the candidate input variables are selected as indicated above, such that $X^1_m, \ldots, X^N_m$ is the m-th measurement of the N-dimensional input space depicting all available variables that could potentially be used to predict $y_m$, the variable of interest. Note that when $m \in \{1, \ldots, M\}$ then M measurements of the process variables are used in the modeling process. At block 154, down-selection is performed as discussed above, for $W^1, \ldots, W^N$ where $W^i \in \{0, 1\}$ is the integer decision variable set that determines whether the i-th input variable $x^i$ is selected as a relevant variable to predict the output variable y. For example if $W^i = 1$ for $i = \{1, \ldots, C\}$ and 0 otherwise, then, only $x^1, \ldots, x^C$ are used in predicting desired variable y. Combinations of these are then provided, as indicated by reference 156, to the candidate functions at block 158. These may include, for example predefined functions $f^1, \ldots, f^F$ reflecting the set of all basis functions that will be considered in modeling the desired variable y. Examples of basis functions include: $f^1(x^1, \ldots, x^C) = x^1$; $f^2(x^1, \ldots, x^C) = x^1 * x^2 * x^2$.

Clearly with a large number of input variables the size of the basis function set, F, could be very large. At block 160, therefore, integer decision variables are selected such that $Z^1, \ldots, Z^F$ where $Z^i \in \{0, 1\}$ is the integer decision variable set that determines which basis function(s) in $f^1, \ldots, f^F$ contribute meaningfully to the prediction of the desired output variable y. The at block 162 continuous decision variables are selected where $c^1, \ldots, c^F$ where $c^i \in R$ is the real variable set that contains the parameters that determine the contribution of each selected basis function to the prediction of the desired variable y.

The introduction of both integer decision variables and continuous parameter variables aims at enabling a more efficient search in a potentially large basis function set and parameter space. A simple constraint such as [summation for all j] $Z^j \leq 3$ for example will ensure that only 3 of the candidate basis functions can be included in predicting y and hence reducing the complexity of the parameter search space. In addition to systematic mixed integer search, other approaches could be used in assigning values to integer variables $Z^i$. For example, a heuristically derived search criterion could be used to assign $Z^i = 0$ for all fi that include 3 or more variables in that term (for example $x^1 * x^2 / x^3$ or $x^1/(x^2 * x^3)$). The heuristic could be the result of a systematic step such as a classification algorithm that segments subsets of the basis function space into regions that are most relevant to the characteristics of the desired output variable.

A MINLP optimization problem can be formulated such that the error in prediction of the desired variable y is minimized by proper selection of integer variables $W^i$, $Z^i$, the continuous decision variables $C^i$, and the proper basis function set $f^i$. It should be noted that in the implementation of FIG. 8, the number of the discrete decision variables is N+F where N is the number of the candidate input variables, and F is the number of the candidate basis functions. For example, if only $x^1, \ldots, x^{10}$ are considered as likely variables for predicting y, and it may be sufficient only to consider basis functions with two input variables $f^k(x^i, x^j)$, and there are 45 possible candidates for each type of $f$ to be considered, for example, 45 possibilities for $f^k(x^i, x^j) = x^i \times x^j$, and 45 possibilities for $f^k(x^i, x^j) = x^i/x^j$. This is a combinatorial complexity that only increases as more function types are considered by the automatic modeling engine. Also, the increase in the number of the candidate input variables will significantly increase the complexity of the mixed integer search. For example, if the number of input candidates is increased by 2 (from 10 to 20 variables), then the number of candidate basis functions specified before will increase from 45 to 190. This may result in a prohibitively large number of discrete and continuous decision variables even for a relatively small modeling problem.

As summarized in FIG. 8, then, following block 162, the continuous decision variable functions are summed at summer 144, and the result 164 is compared at block 146 to the variable Y, 166 to provide output 168. The error is fed back to block 148 as discussed above, and the resulting set of data points J is provided to block 150 where they may be used to refine the decisions of blocks 154, 160 and 162.

In addition to selecting the relevant input variables for the model, the functional dependency of the "desired target" (i.e., output) variable(s) on the selected input variables must be determined. Given a set of points $(x_1, x_2, \ldots, x_n, y)$, received either as a batch of operational data that is stored in a historian/database, or as a streaming flow of process measurements continuously consumed by the modeling engine, or as a hybrid of batch and streaming data, the appropriate model is found such that: +++

Y: variable(s) to be approximated (for simplicity of exposition $Y \in R^1$);

$x_i$: independent variables used as model input;

X: vector of all input variables used in a model $(x_1, x_2, \ldots, x_n)$;

I: set of all input variables, $i = 1, \ldots, N$;

J: set of input datapoints, $j = 1, \ldots, M$;

K: set of basis functions $f^k$, $k = 1, \ldots, K$;

$f^k$: basis function used to approximate Y, $f^k: R^n \rightarrow R^1$;

$c_k$: coefficient of the basis function included in the functional approximation of Y, $c_k \in R^+$;

$W_k$: binary variable denoting the sign of coefficient in the model, $W_k=1$ implies the coefficient is positive and $W_k=0$ implies the coefficient is negative;

$Z_k$: binary variable denoting whether the term is used for fitting, $Z_k=1$ implies the term is used and $Z_k=0$ implies the term is not used;

$\zeta$: total fitting error; and $\hat{f}_j^k$: the evaluated value of function $f^k$ at point $X_j$.

The objective is to determine ck and Zk such that [the summation for all k] of $c_k f^k(X_j)Z_k$ is as close to $Y_j$ as possible. In mathematical terms, the problem can be formulated as follows:

$$\min[\text{sum for all } j] \text{ of } [Y_j - ([\text{sum for all } k] \text{ of } c_k f^k(Xj) (2W_k-1)] = [\text{sum for all } j] \text{ of } [Y_j - c_k f_j^k Z_k]^2;$$

such that: [sum for all k] of $Zbar_k \leq M$,
and $Z_k C_k^L \leq c_k \leq Z_k C_k^U$,
and $W_k \leq Z_k$,
and $Zbar - Z \geq 0$,
and $Z \in [-1,1]$, $Zbar_k \in (0,1)$, $c_k \in R^+$.

As will be appreciated by those skilled in the art, $Z_k$ is the complicating variable. If $Z_k$ is fixed, then the problem is a nonlinear programming task that can be solved globally by combination of nonlinear programming, sequential least squares programming, and multi-start techniques.

FIG. 9 illustrates a contemplated adaptation of the modeling approach where the complexity of the MINLP search process is considerably reduced. In this approach, rather than defining an integer variable, $Z^i$, and a continuous variable, $C^i$, for each basis function, $f^i$, a smaller number of "compound basis functions" is introduced for which the integer and continuous decision variables are assigned. A variable $\varphi^j$, $j \in \{1, \ldots, \Phi\}$, is defined as the set of "compound basis functions" that are utilized to model the desired output variable y:

$$\varphi^j(x^1, \ldots, x^C) = [\text{sum from } f \text{ to } F] \text{ of } r^{j,f} f^f(x^1, \ldots, x^C);$$

where $r^{j,f} \in [0,1]$ are randomly generated coefficients that combine the atomic basis function candidates, $f^f$, into a smaller number of "compound basis functions". With a smaller number of candidate basis functions the number of integer decision variables and continuous decision variables will be reduced. The approximate model for the desired output variable y at time step m is then:

$$\hat{y}_m = [\text{sum from } j \text{ to } \Phi] \text{ of } Z^j C^j \times [\text{sum from } f \text{ to } F] \text{ of } r^{j,f} f^f(x^1, \ldots, x^C).$$

This process is summarized in FIG. 9, where the output of block 158 is selected to create the rs 174, and these are selectively summed at blocks 178, 189 and 182, for example. Only these resulting sums are then applied to block 184 for selection of the integer decision variables Z.

The randomness of $r^{j,f} \in [0, 1]$ is exploited to ensure the robustness of the model. More specifically, an outer loop is considered that varies the random assignment of $r^{j,f}$. For each assignment of $r^{j,f}$, a mixed integer optimization problem is addressed to solve for $Z^j$'s, and $C^j$'s. The sensitivity of the prediction error to the decision variables is then calculated for that particular selection of random variables. A model with least sensitivity to the variations in $Z^j$'s, and $C^j$'s will be adopted as the preferred model. The inclusion of the integer variables $Z^j$ is useful to reduce the complexity of the parameter search.

From the above, it may be noted that the present techniques provide a systematic optimization-based approach to the problem of automatic modeling of complex processes in automation environments with little or no expert input.

Moreover, the modeling solution provides favorable numerical properties that can be efficiently solved in real-time. The solution of FIG. 9, in particular, enables massive reduction in computational complexity of the mixed integer optimization search, while offering a systematic framework to ensure robustness of the automatic modeling process.

Regarding the analytics engine for classification, a key original contribution of present disclosure is the augmentation of the raw data with automatically extracted features from the data that capture potential causal relationships between process variables as a discriminating signature of the process state. The extracted features will enable self-filtering and self-validation of the raw data without human involvement. They will also offer classification engine a potentially decisive additional information that could lead to more pronounced separation between identified classes. The data-driven automatic modeling module is a contemplated embodiment for extracting such causality-based features in the raw data.

Certain presently contemplated embodiments may make use of "clustering" to provide classification of a range of variables, including numerical inputs, textual inputs, alarms, and so forth. In general, such clustering may consist of grouping a set of objects in such a way that the object of the same group or cluster are more similar, in some sense, to one another than to those of other groups or clusters. For agnostic platforms such that of the disclosed analytics engine, no prior knowledge or assumptions regarding the inputs or their relationships is required, and the analysis may be performed on the basis of static or batch data sets, or on streaming data. In the latter case, the classification that results may change based upon the receipt of new data and whether the items or values being classified are more or less like those for which classification has already been established. The algorithms may periodically save original data or cluster definitions, and "outlier" data points may be pruned or altered based upon ongoing analysis. In many cases, insights into the nature of the input data, and how it may be more simply classified and handled (e.g., for monitoring, control, modeling, optimization, etc.) may result from the analysis. This makes the classification module contemplated here particularly useful in combination with other data-driven modules. Indeed, classification of variables may proceed the modeling analysis outlined above, classification may follow such modeling, or control, or optimization (e.g., for determining possible conditions requiring alarms or operator intervention), and so forth.

FIG. 10 illustrates exemplary logic 186 for performing classification via a modular analytics engine in accordance with the present techniques. The process may begin at step 188 where the desire data structure is received or accessed as discussed above. The data-driven instantiation of the classification module is illustrated at block 190. The classification module then performs classification, clustering, and similar operations on the data set to determine and refine one or more classes, at block 192, in one or multiple dimensions based upon the data set. As noted above, these operations may be performed in static or batch processing, or on streaming data as it is received and made available to the analytics engine. In the latter case, the logic may determine whether new data is available at block 194, and then analyze such new data in connection with existing data as indicated at block 196. Because classification of new data is dependent upon classification of existing data (and new data may even influence existing classification), this process may be continuous as indicated by the return arrow to block 192. Following classification, the output data structure is created as indicated at block 198. This output data structure may be stored or passed to other modules as indicated above, and as is shown by reference 200 in FIG. 10. In some cases, the classification may be presented to human operators who may review the classification, refine it, or perform other operations as discussed below.

In some cases, it will be desirable to utilize more than one algorithm for classification, clustering, or similar operations. FIG. 11 illustrates a technique for combining such classification algorithms. These may be performed in a single module instantiated by the input data set. As shown in FIG. 10, a first classification algorithm may be called to perform classification on the data set, while a second algorithm performs classification at the same time or at a subsequent time. Based upon the classes, the members of the classes, and any desired performance or evaluation criteria, the resulting data sets may be compared, combined, or otherwise process as indicated at block 208. As discussed below, several algorithms are contemplated for the desired classification. Because the different algorithms may provide different performance, the use of multiple algorithms either in parallel or a series may assist in providing robust and reliable results.

Clusters may be regarded as regions in the data space in which the objects are dense, and which are separated by regions of low object density (noise). Higher density clusters are completely contained in lower density clusters. The intrinsic cluster structure of many real world data cannot be characterized by global density parameters. Very different local densities may be needed to reveal clusters in different regions of data space. Several algorithms may be used for the present classification or clustering. For example, algorithms may be based upon so-called ordered points to identify clustering structure, or OPTICS techniques. OPTICS is a density-based clustering method, and does not produce a clustering of a dataset explicitly, but instead creates an augmented ordering of the database representing its density based clustering structure called reachability plot. Interpretation of clusters based on density plot is straightforward. For a dataset with no noise, a large increase in density indicates the start of a new cluster. For noisy dataset, the clusters are separated by noise, defined as points with density below certain threshold.

As mentioned, the classification performed by the analytics engine may be of any desired number of dimensions. FIG. 12 illustrates an exemplary three-dimensional example. Such classification may be based upon characteristics of the input data that could be identified in the annotations of the data structure. The classification 276 is illustrated as plotting along three axes 210, 212 and 214. In this illustration three clear clusters 216, 218 and 220 shown, here visible graphically. In practice, classes may be less well defined, and dimensions may not be as susceptible to graphical illustration, depending upon the type and characteristics of the data.

FIGS. 13 and 14 illustrate errors that may be avoided by the present techniques, and particularly by the use of multiple algorithms and criteria in combination. In both figures, an input data structure is illustrated graphically and designated by reference numeral 222. The structures comprise three potentially distinguishable types of data indicated by reference numerals 224, 226, and 228. The erroneous classification of FIG. 13 involves the inclusion of more than one distinguishable type of data in output class 230. The other output classes 232 and 234 are generally valid, except for the inclusion in class 298 of certain of their members. In the erroneous classification of FIG. 14, on the other hand, output classes 238 and 240 are generally valid, but two classes 236 are identified that should have been combined into a single class.

Certain criteria may be applied in the processing to reduce the chance of such errors. FIG. 15 illustrates exemplary logic 242 for classification that may utilize certain of these criteria. The processing may begin at step 244 with application of one or more classification algorithms as discussed above. At block 246, a check for false positives is applied to all data points that have been considered and classified. At block 248 a check for false negatives may be applied to aid in ensuring that all classes are statistically meaningful. A measure to assess the overall accuracy of the classification algorithm may be applied at block 250. At block 252 the final classes are created and refined.

In certain approaches to the classification contemplated, historical data, operator input, or expert input may be used to refine, inform, alter, and otherwise modify the classification. In some cases, the classification engine may also learn from such input. One example of such input is shown in FIG. 15. As illustrated, in block 254, the classification resulting from the analysis is combined with operator or expert input 254 as indicated at summing block 256. Such input may be particularly useful where operators or experts have firsthand knowledge of performance of automation systems, how to treat or interpret certain data and events, and so forth.

In a particular embodiment, the classification engine has been found useful in textual classification that is often problematic as compared to classification of numerical values. One exemplary application of this type of classification is for alarms generated in industrial automation systems. As will be readily understood by those skilled in the art, such alarms may be visual, audible, or may result in calls to maintenance or operational personnel which, if the alarm is erroneous, or necessary, results in perturbations in production and automated processing. Accordingly, it is often useful to refine such alarms, and to avoid nuisance alarms when possible, while at the same time ensuring that useful and necessary alarms are reliably provided. For improved efficiency, it may be useful to submit existing or contemplated alarms to the analysis engine for refinement and recommendations.

FIG. 16 illustrates textual classification in accordance with embodiments of the present techniques that may be used for such applications. The textual classification 258 may begin with a parsing operation 260. This operation may be performed in various manners on the text of the input data, such as to remove certain identifiers as indicated at 262, remove punctuation as indicated at 264, analyze stemming as indicated at 266, remove stop words as indicated at 268, and handle tokenization as indicated at 270. The resulting processed text can then be used to perform classification is indicated at 272. Here again, and particularly for applications such as industrial automation alarms, operators and experts may have substantial knowledge of systems, processes, and event occurrences that may or may not actually require attention, or that in some cases require attention but for which alarms are not common or even existing. Their input may be considered as indicated at reference 274, and combined with the output analytical classification as indicated something block 276. Based upon such input, here again, the classification may be further refine and finalize.

Regarding the operation of the analytics engine for the optimization module, a key original contribution of present disclosure is the data-driven validation, monitoring, and maintenance of the optimization problem definition (including cost function, constraints, and process models), via automatic deployment of modeling and classification modules. It is important to point out that present disclosure proposes the use of distance from operational constraints and deviation from optimization targets to augment measured operation, process, machine, etc. in this validation, monitoring and maintenance process. Any suitable optimization approach may be used. Such approaches may be based upon establishment of cost or penalty functions for the variables used in the modeling of the machine or process. Such optimization techniques are summarized, for example, in U.S. Pat. Nos. 8,897,900, and 8,874,242, both to Smith et al., and both entitled Graphical Language for Optimization and Use, which are incorporated into the present disclosure by reference in their entirety for all purposes.

Moreover, as noted above, UAMs may provide data points to the optimization engine at various times based on the output of the various model modules. In addition to adapting the output of the model modules, the UAMs may perform functionality including performing model reduction that includes an explicit optimization to reduce model order, automatically generating code that represents a model and a specific solver, as opposed to a general solver, for the model to be used by the optimization engine (e.g., code that optimizes the optimization engine), constructing a mathematical model using the output from the model modules, sending data point information to the optimization engine, another model module, and/or a database, and so forth. The use of databases in optimization-based control is described in more detail in U.S. patent publication no. 2015/0134647, filed by SayyarRodsari et al. on Nov. 11, 2013, and entitled Control System Database Systems and Methods, which is incorporated herein by reference in its entirety for all purposes. The UAMs may provide the data points on demand, at a periodic time interval, when a flag is set, when a tolerance change that meets a certain threshold has been detected, and the like. The optimization engine may use the data points to approximate the process model and generate a surface to simulate control actions to determine which control actions result in a desired state of the process. Then, the determined optimal control actions may be applied to control the process.

Using the open modeling architecture, a large number of equations or complex computations may be processed by the model-based controller without the expensive online computations negatively impacting the execution frequency of the controller. More specifically, if a parametric hybrid model module relies on expensive time consuming computations to generate its output (e.g., using a nonlinear optimization to solve a set of implicit equations), then the execution frequency of the main computation loop for the controller can be decoupled from the execution frequency for the computations in that model module. Thus, the controller may use data points previously obtained or accessible via the database to make control action decisions by perturbing a rigorously defined model without having to wait on the model modules to finish processing before making a decision. However, whenever new data points are generated by the model modules, the data points may be provided to the controller so that a new surface may be generated with the new data points.

For control via the modular, data-driven analytics engine, a key contribution of the present disclosure is the use of controller performance metrics as augmented data in automated monitoring and maintenance of the control engine. It is important to note the distinction from traditional adaptive control schemes. While adaptive control attempts to modify the controller response via variation of some pre-specified controller parameters (e.g. proportional, integral, and derivative coefficients in a PID controller), the data-driven analytics engine will be able to identify what component of a controller module should be modified to most efficiently enhance the controller behavior. For example, in an MPC control scheme, the use of a data-driven analytics engine could automatically determine whether a model mismatch contributes more to the poor controller performance or a poor selection of the penalty term for a manipulated variable. Again, any suitable control approach may be adopted, particularly based upon the model and/or optimization performed. Where the control is largely model-based, for example, MPC approaches may be employed to determine control inputs over a determined horizon (typically a number of iterative steps ahead of real time). Such control techniques are summarized, for example, in U.S. Pat. No. 9,448,546, to SayyarRodsari et al., entitled Deterministic Optimization Based Control System and Method for Linear and Non-linear Systems, and U.S. Pat. No. 9,400,491, to Kolinsky et al., entitled Stabilized Deterministic Optimization Based Control System and Method, which are both incorporated into the present disclosure by reference in their entirety for all purposes.

The forgoing techniques may be used in any number of industrial automation environments and to address various problems where data is available for analysis. For example, it is contemplated that exemplary modeling, optimization, classification and control applications might include determining likelihood (and timing) of failure or to prevent failure, servicing and maintenance needs; cloud-based monitoring and analysis of system performance (e.g., oilfield equipment health and efficiency), robust classification of input and control data of when data quality is poor or questionable; pump modeling and performance monitoring; optimal PID loop tuning; real time alarm management to provide consistent recommendations and avoid unnecessary or nuisance alarms; and analysis of power utilization and prediction of power needs. However, again, the tools disclosed are generally modular, and agnostic, and may address any desired issues with little or no expert input.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A non-transitory computer readable medium storing a program causing a computer to execute a method for a physical processor comprising:
   receiving, from a plurality of sensors, operational parameters of a controlled machine or process to produce sensed data;
   receiving annotated input data for respective input variables, the annotated input data being derived from the sensed data or from data generated by an automation controller; and
   generating a model, via an analytics engine executed by a processor that receives the annotated input data and employs a mixed-integer nonlinear programming solver to generate the model based upon an agnostic model stored in a memory and upon the annotated input data derived from the sensed data or from the data generated by an automation controller by naming of the input data, selection of the input data, selection of one or more parameters or variables of interest in the input data, or computations made on the input data, wherein the agnostic model comprises a set of candidate base functions that are used to build the model from variables of interest, and wherein the analytics engine selects input variables of interest of the system represented by the annotated input data for provision to the candidate base functions.

2. The non-transitory computer readable medium of claim 1, wherein the annotated input data is provided to the analytics engine as a data structure, and wherein the analytics engine outputs data defining the model as a data structure.

3. The non-transitory computer readable medium of claim 1, wherein the agnostic model comprises a plurality of candidate functions that can be executed for each input variable of the annotated input data and combined to form candidate relationships between the input variables and output variables.

4. The non-transitory computer readable medium of claim 3, wherein the agnostic model comprises a selection filter for down-selecting the input variables.

5. The non-transitory computer readable medium of claim 4, wherein the selection filter is configured to receive human selections for down-selecting the input variables.

6. The non-transitory computer readable medium of claim 3, wherein the agnostic model comprises a combinatorial stage that combines the candidate relationships to generate a candidate model.

7. The non-transitory computer readable medium of claim 6, wherein the combinatorial stage at least partially randomly combines the candidate relationships.

8. The non-transitory computer readable medium of claim 1, wherein the analytics engine comprises a plurality of analytics modules instantiatable when provided with annotated input data in a pre-defined data structure, the analytics modules comprising a modeling module that is instantiated to generate the model.

9. The non-transitory computer readable medium of claim 8, wherein the analytics modules comprise at least an optimization module in addition to the model module.

10. The non-transitory computer readable medium of claim 1, wherein the analytics engine is configured to generate the model based upon historical input data.

11. The non-transitory computer readable medium of claim 1, wherein the analytics engine is configured to generate the model during operation of the automation controller and while the input data is being generated by the controlled system or process.

12. A non-transitory computer readable medium storing a program causing a computer to execute a method for a physical processor comprising:
  receiving, from a plurality of sensors, operational parameters of a controlled machine or process;
  generating a model, via an analytics engine executed by a processor that receives annotated input data derived from the sensed data or from data generated by an automation controller by naming of input data, selection of the input data, selection of one or more parameters or variables of interest in the input data, or computations made on the input data, based upon an agnostic model stored in a memory and upon the annotated input data, wherein the analytics engine selects input variables of interest of the system represented by the annotated input data for provision to candidate base functions of the agnostic model, and reduces an error between a prediction-based variable and a measurement-based variable based upon integer decision variables, a subset of the input variables, and a subset of the candidate functions.

13. The non-transitory computer readable medium of claim 12, wherein the annotated input data comprises a first data structure, and wherein the analytics engine outputs data defining the model as a second data structure.

14. The non-transitory computer readable medium of claim 12, wherein the agnostic model comprises a plurality of candidate base functions that can be executed for each input variable of the annotated input data and combined to form candidate relationships between the input variables and output variables.

15. The non-transitory computer readable medium of claim 12, wherein the analytics engine comprises a plurality of analytics modules instantiatable when provided with annotated input data in a pre-defined data structure, the analytics modules comprising a modeling module that is instantiated to generate the model.

16. The non-transitory computer readable medium of claim 15, wherein the analytics modules comprise at least an optimization module in addition to the model module.

17. The non-transitory computer readable medium of claim 12, wherein the analytics engine is configured to generate the model based upon historical input data.

18. The non-transitory computer readable medium of claim 12, wherein the analytics engine is configured to generate the model during operation of the automation controller and while the input data is being generated by the controlled system or process.

19. A non-transitory computer readable medium storing a program causing a computer to execute a method for a physical processor comprising:
  receiving annotated input data derived from the sensed data or from data generated by an automation controller by naming of input data, selection of the input data, selection of one or more parameters or variables of interest in the input data, or computations made on the input data; and
  generating a model via an analytics engine executed by a processor based upon the annotated input data and an agnostic model stored in a memory;
  wherein the analytics engine selects input variables of interest of the system represented by the annotated input data for provision to candidate base functions of the agnostic model, and reduces an error between a prediction-based variable and a measurement-based variable based upon integer decision variables, a subset of the input variables, and a subset of the candidate functions.

20. The non-transitory computer readable medium of claim 19, wherein the agnostic model comprises a plurality of candidate functions that can be executed for each input variable of the annotated input data and combined to form candidate relationships between the input variables and output variables.

* * * * *